United States Patent
Uchino et al.

(10) Patent No.: US 10,064,237 B2
(45) Date of Patent: Aug. 28, 2018

(54) COMMUNICATION APPARATUS, AND LAYER 2 STATE CONTROL METHOD

(71) Applicant: NTT DOCOMO, INC., Tokyo (JP)

(72) Inventors: Tooru Uchino, Tokyo (JP); Hideaki Takahashi, Tokyo (JP); Wuri Andarmawanti Hapsari, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 39 days.

(21) Appl. No.: 15/032,278

(22) PCT Filed: Oct. 28, 2014

(86) PCT No.: PCT/JP2014/078652
§ 371 (c)(1),
(2) Date: Apr. 26, 2016

(87) PCT Pub. No.: WO2015/064583
PCT Pub. Date: May 7, 2015

(65) Prior Publication Data
US 2016/0255659 A1    Sep. 1, 2016

(30) Foreign Application Priority Data

Oct. 31, 2013  (JP) .................................. 2013-227528

(51) Int. Cl.
*H04W 76/40* (2018.01)
*H04W 80/02* (2009.01)
(Continued)

(52) U.S. Cl.
CPC ........... *H04W 76/40* (2018.02); *H04L 12/189* (2013.01); *H04L 67/1061* (2013.01); *H04W 76/14* (2018.02); *H04W 80/02* (2013.01)

(58) Field of Classification Search
CPC ..................................................... H04W 76/40
See application file for complete search history.

(56) References Cited

U.S. PATENT DOCUMENTS

| 2005/0074024 | A1 | 4/2005 | Kim et al. |
| 2012/0287841 | A1* | 11/2012 | Takahashi ........... H04L 12/1881 370/312 |

(Continued)

FOREIGN PATENT DOCUMENTS

| JP | 2007-502070 A | 2/2007 |
| WO | 2012167432 A1 | 12/2012 |

OTHER PUBLICATIONS

International Search Report issued in PCT/JP2014/078652 dated Nov. 25, 2014 (2 pages).

(Continued)

*Primary Examiner* — Jason E Mattis
(74) *Attorney, Agent, or Firm* — Osha Liang LLP

(57) ABSTRACT

A communication apparatus including a function configured to perform data transmission by multicasting to a plurality of apparatuses by radio communication, including: a request reception unit configured to receive a join request from an apparatus that desires multicast data reception from the communication apparatus; a match control unit configured to perform control for matching values of a state variable of layer 2 in the radio communication between the communication apparatus and the apparatus that transmits the join request in response to receiving the join request by the request reception unit.

7 Claims, 8 Drawing Sheets

(51) Int. Cl.
*H04L 29/08* (2006.01)
*H04L 12/18* (2006.01)
*H04W 76/14* (2018.01)

(56) References Cited

U.S. PATENT DOCUMENTS

| | | | | |
|---|---|---|---|---|
| 2013/0265974 A1* | 10/2013 | Van Phan | ............. | H04W 36/02 370/329 |
| 2014/0010141 A1* | 1/2014 | Kim | .................... | H04W 68/005 370/312 |
| 2014/0105096 A1 | 4/2014 | Wang et al. | | |
| 2014/0313949 A1* | 10/2014 | Lilleberg | ............. | H04L 5/1469 370/280 |

OTHER PUBLICATIONS

Written Opinion of the International Searching Authority issued in PCT/JP2014/078652 dated Nov. 25, 2014 (4 pages).
Qualcomm Incorporated, "Study on LTE Device to Device Proximity Services"; 3GPP TSG RAN Meeting #58, RP-122009; Dec. 7, 2012 (6 pages).
Extended Search Report issued in the counterpart European Patent Application No. 14858492.3, dated Oct. 19, 2016 (12 pages).
Office Action issued in the counterpart Japanese Patent Application No. 2013-227528, dated Sep. 26, 2017 (5 pages).
Office Action issued in the counterpart Japanese Patent Application No. 2013-227528, dated Dec. 19, 2017 (6 pages).
LG Electronics; "Resource Management for D2D Communications"; 3GPP TSG RAN WG1 Meeting #74, R1-133791; Barcelona, Spain, Aug. 19-23, 2013 (14 pages).
LG Electronics Inc.; "Issues in D2D communication"; 3GPP TSG-RAN WG2 #83bis, R2-133579; Ljubljana, Slovenia, Oct. 7-11, 2013 (3 pages).
LG Electronics; "Physical layer enhancements for D2D communication"; 3GPP TSG RAN WG1 Meeting #73, R1-132250; Fukuoka, Japan, May 20-24, 2013 (10 pages).
Office Action issued in corresponding European Patent Application No. 14858492.3, dated Nov. 24, 2017 (10 pages).
Official Notification issued in corresponding Japanese Application No. 2013-227528, dated Apr. 24, 2018 (8 pages).
Huawei; "RLC UM procedure for MBMS reception"; 3GPP TSG-RAN WG2 Meeting #67, R2-094423; Shenzhen, China; Aug. 24-28, 2009 (3 pages).

\* cited by examiner

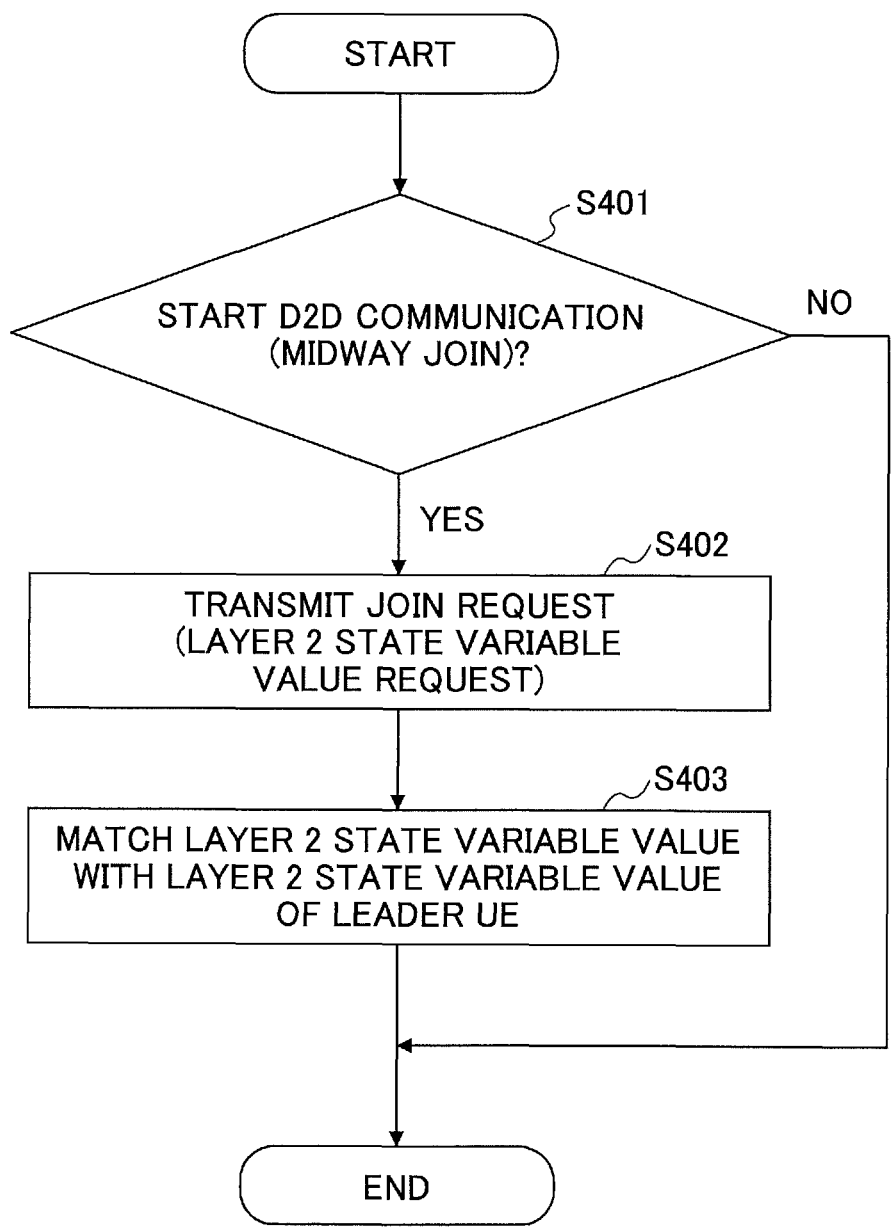

COMMUNICATION APPARATUS, AND LAYER 2 STATE CONTROL METHOD

TECHNICAL FIELD

The present invention relates to D2D communication (device-to-device communication). More particularly, the present invention relates to a technique for a user apparatus UE to start communication smoothly in multicast communication in D2D communication.

BACKGROUND ART

In a mobile communication system, it is common that a terminal (to be referred to as "user apparatus UE" hereinafter) and a base station eNB perform communication so that communication is performed between user apparatuses UE. However, in recent years, various techniques are considered for performing direct communication between user apparatuses UE (non-patent document 1, for example). When performing communication between user apparatuses UE, a user apparatus UE receives a discovery signal from another neighboring user apparatus UE, so that the user apparatus UE discovers the other user apparatus UE that becomes a communication partner so as to perform D2D communication with the user apparatus UE.

According to D2D communication, traffic between UE-eNB can be offloaded, and communication can be performed even when a base station eNB cannot perform communication due to disaster and the like.

On the other hand, in the LTE (Long Term Evolution) system, packet based radio communication is utilized. In such a packet based radio communication, a plurality of hierarchical layers execute various kinds of functions for radio communication, so that radio communication is realized. In LTE, it is defined that radio communication is realized by a layered structure of radio interface protocols shown in FIG. 1.

The radio interface protocols shown in FIG. 1 include a PHY (Physical) layer, a MAC (Media Access Control) layer, a RLC (Radio Link Control) layer, a PDCP (Packet Data Convergence Protocol) layer, and a RRC (Radio Resource Control) layer. Although the radio interface protocols are protocols between a user apparatus UE and a base station eNB, protocols similar to the radio interface protocols shown in FIG. 1 may be utilized in D2D communication between user apparatuses UE.

In the protocols shown in FIG. 1, the PDCP layer which is a sublayer of layer 2 provides with functions such as secrecy processing, tampering detection, and header compression and the like of an IP (Internet Protocol) packet. A COUNT value that includes HFN (Hyper Frame Number) and PDCP SN (Sequence Number) is used for secrecy processing and tampering detection.

PDCP SN is incremented each time when a PDCP packet is transmitted from the PDCP layer to the RLC layer, and for example, a PDCP SN within a range from "0" to "4095" is cyclically provided to a PDCP packet. For example, a sequence number "0" is provided to a PDCP packet that is transmitted to the RLC layer next to a PDCP packet of a sequence number "4095". HFN is incremented each time when the PDCP SN goes round. The COUNT number is formed such that it has HFN in upper bits, and PDCP SN in lower bits. In the LTE system, only a PDCP SN of the COUNT value is transmitted to a receiving side. HFN is not transmitted. Therefore, the receiving side estimates HFN of a received packet based on reception status.

Outline of operation of the PDCP layer is as follows. In a transmission side, a PDCP entity executes secrecy processing, tamper detection and header compression on the packet received from an upper layer, that is, on a PDCP SDU (Service Data Unit), by using the COUNT value, and adds a PDCP SN to the header so as to transmit the packet as a PDCP packet, that is, as a PDCP PDU (Packet Data Unit) to the RLC layer.

On the other hand, in the receiving side, as shown in FIG. 2, the PDCP entity manages a reception window of a predetermined size for correcting the order of received packets. In a case where a PDCP SN of a packet received from the transmission side falls within a reception window, the PDCP entity estimates an HFN used for deciphering of the packet based on the current reception status, and executes deciphering on the received packet based on the COUNT number formed by the estimated HFN and a PDCP SN of the header. After that, the PDCP entity transmits the processed packet to an upper layer to update the reception window. On the other hand, in a case where a PDCP SN of the packet received from the transmission side is outside the range of the reception window, the PDCP entity discards the packet.

Next, outline of the RLC layer is described. In the RLC layer, window control is performed in the transmission side and the reception side for providing order control and duplication control.

Tx window is managed in the transmission side, and Rx window is managed in the reception side. The transmission side adds a sequence number (SN) each time when transmitting a new RLC PDU so as to transmit a RLC PDU including the SN to the reception side. In the transmission side, transmitted RLC PDU is stored in a buffer, and the RLC PDU is discarded after checking of Status report(ACK) from the reception side.

The Rx window in the reception side is updated when the reception side receives RLC PDUs in the order of SN without any drop. Also, Tx window of the transmission side is updated based on Status report from the reception side.

As exemplary shown in FIG. 3, in a case where the transmission side cannot receive Status report from the reception side, the transmission side cannot update Tx window. As a result, Tx window stalling occurs so that new data cannot be transmitted. At this time, the reception side cannot receive the new data. ProhibitTimer shown in FIG. 3 is a timer for reducing an overhead due to frequent transmission of Status report. ProhibitTimer starts at the time of transmission of Status report, and transmission is not performed even when Status report is triggered during the timer is running.

As described above, in RLC/PDCP, window control is performed based on the SN added in the transmission side, and, for example, when the reception side receives data of a SN outside of the window, the data is discarded.

RELATED ART DOCUMENT

Non Patent Document

[NON PATENT DOCUMENT 1] 3GPP TSG RAN Meeting #58 RP-122009 07 December 2012

SUMMARY OF THE INVENTION

Problem to be Solved by the Invention

As a form of D2D communication, D2D communication of 1:M communication is being studied. In this form, a user apparatus UE (that may be referred to as a leader UE) that is a leader performs multicast communication to a plurality of user apparatuses UE that becomes D2D communication partners.

In multicasting, a situation occurs in which a user apparatus UE joins in a group while 1:M communication is already being performed.

However, in a case where order control and duplication discard control are applied to RLC/PDCP as described before for D2D communication, even though a new user apparatus UE joins in the already-started 1:M communication in the middle, values (example: RLC/PDCP SN) of a state variable in RLC/PDCP do not match between a transmitting UE which is a leader and the newly joined user apparatus UE. Therefore, even if the newly joined user apparatus UE can receive multicast-transmitted data, there is a possibility that the data is discarded or that secrecy cannot be solved well. So, there is a problem in that D2D communication cannot be started smoothly.

For example, as shown in FIG. 4, when a leader UE transmits data of RLC/PDCP with SN=1000, each user apparatus UE that has already joined in a multicast group waits for data of SN=1000. On the other hand, although a newly joined user apparatus UE waits for data of SN=0 (initial value), actually-received data is SN=1000 so that the data becomes outside of window and the data is discarded.

The present invention is contrived in view of the above-mentioned point, and an object of the present invention is to provide a technique that enables a user apparatus UE to smoothly start D2D communication in D2D communication that performs multicasting.

Means for Solving the Problem

According to an embodiment of the present invention, there is provided a communication apparatus including a function configured to perform data transmission by multicasting to a plurality of apparatuses by radio communication, including:

a request reception unit configured to receive a join request from an apparatus that desires multicast data reception from the communication apparatus;

a match control unit configured to perform control for matching values of a state variable of layer 2 in the radio communication between the communication apparatus and the apparatus that transmits the join request in response to receiving the join request by the request reception unit.

Also, according to an embodiment of the present invention, there is provided a communication apparatus including a function configured to receive data that is transmitted by multicasting from a predetermined apparatus by radio communication, including:

a request transmission unit configured to transmit a join request for performing multicast data reception from the predetermined apparatus; and a match control unit configured to receive, from the predetermined apparatus that receives the join request, a signal for matching values of a layer 2 state variable in the radio communication between the predetermined apparatus and the communication apparatus, and to use a value of the layer 2 state variable obtained based on the signal for the radio communication.

Effect of the Present Invention

A technique that enables a user apparatus UE to smoothly start D2D communication is provided in D2D communication that performs multicasting.

BRIEF DESCRIPTION OF THE DRAWINGS

FIG. 10 is a process flow when the user apparatus desires to newly receive multicast data distributed from a leader user apparatus UE.

EMBODIMENTS FOR CARRYING OUT THE INVENTION

In the following, an embodiment of the present invention is described with reference to figures. The embodiment described below is merely an example, and the embodiment to which the present invention is applied is not limited to the embodiment below. For example, although the present embodiment takes RLC/PDCP, as an example, that is a layer 2 protocol in a radio interface in a technical specification (LTE) of 3GPP, application target of the present invention is not limited to these. The present invention can be applied to all communication schemes in which control of data transmission and reception is performed between a transmission side and a reception side based on a value of a layer 2 state variable such as SN of RLC/PDCP. Also, in the present embodiment, based on the assumption of a radio communication scheme complying with LTE, it is assumed that radio interface protocols similar to the radio interface protocols (RRC, PDCP, RLC, MAC, PHY) between UE-eNB are used in D2D communication between user apparatuses UE. However, the radio communication scheme that becomes a target of the present invention is not limited to the scheme complying with LTE.

Also, in the specification and claims, the term "LTE" is used as a term having a meaning including not only communication schemes corresponding to release 8 or 9 of 3GPP, but also communication schemes corresponding to release 10, 11, or 12 or later.

(System Whole Configuration, Operation Content)

Figure 1:
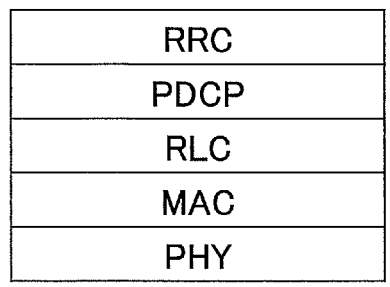
FIG. 1 is a diagram showing radio interface protocols in LTE.
Figure 2:
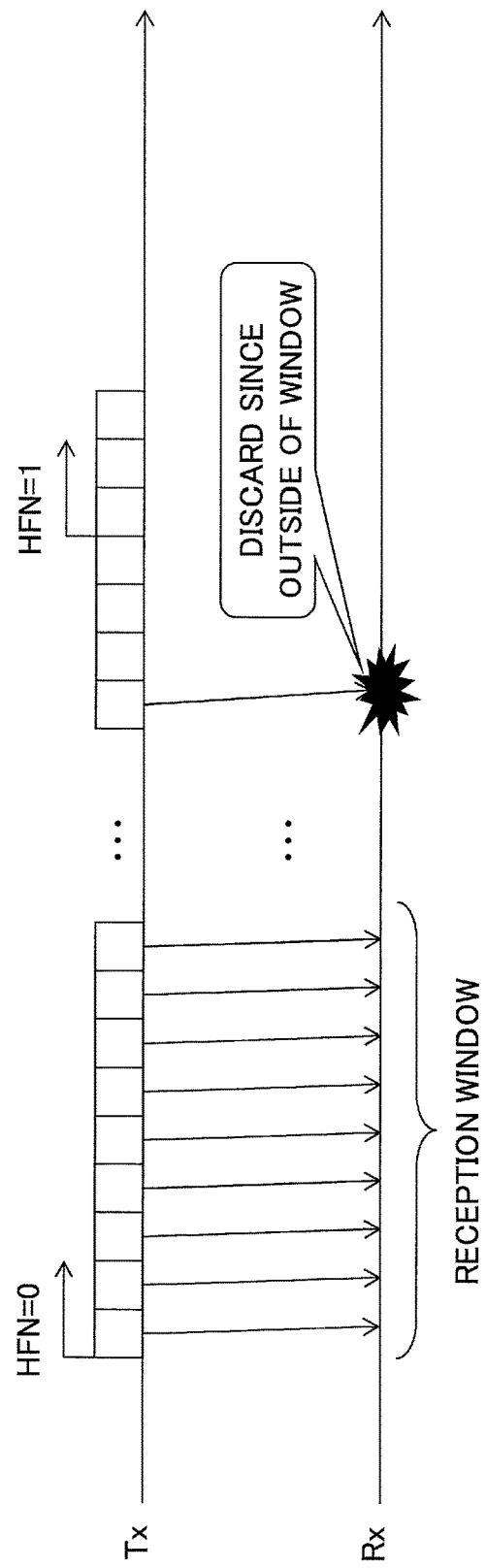
FIG. 2 is a diagram showing an operation example in PDCP layer.
Figure 3:
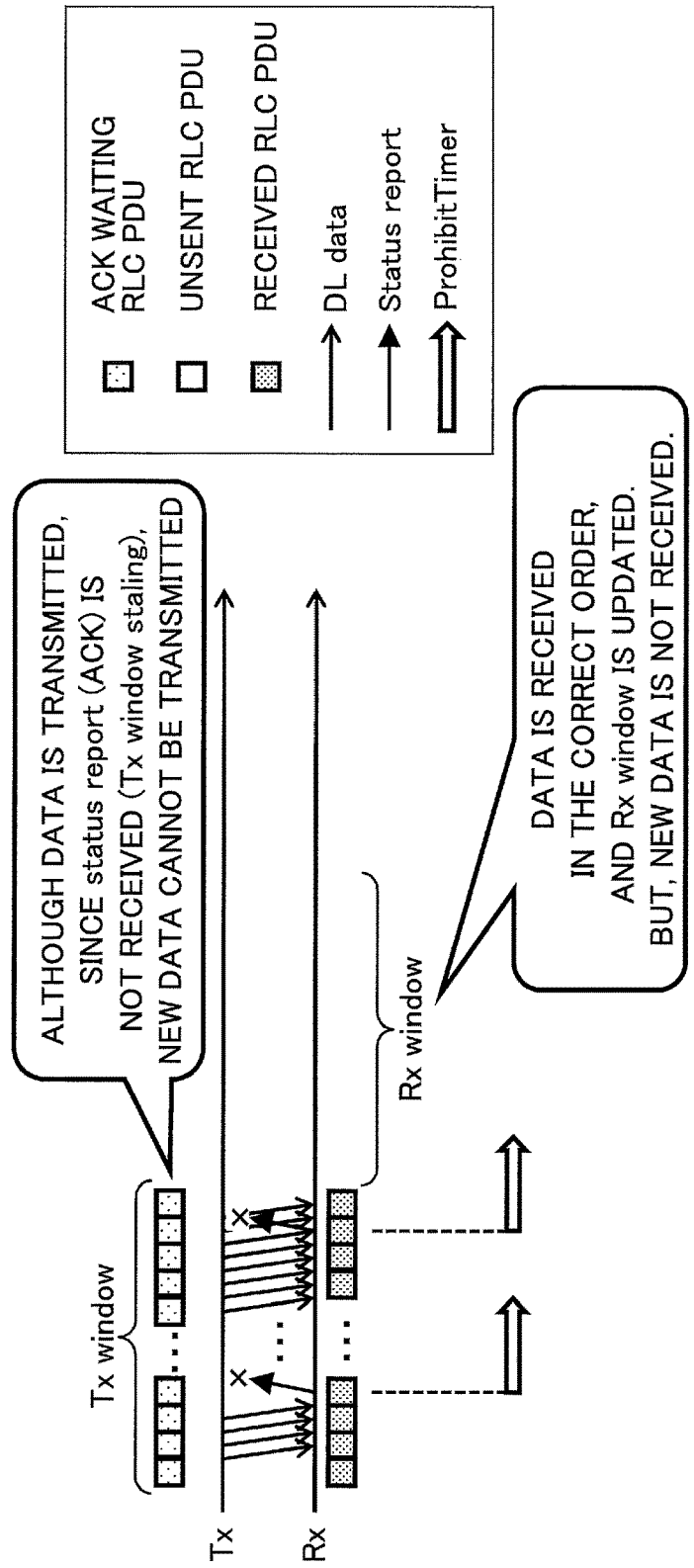
FIG. 3 is a diagram showing an operation example in RLC layer.
Figure 4:
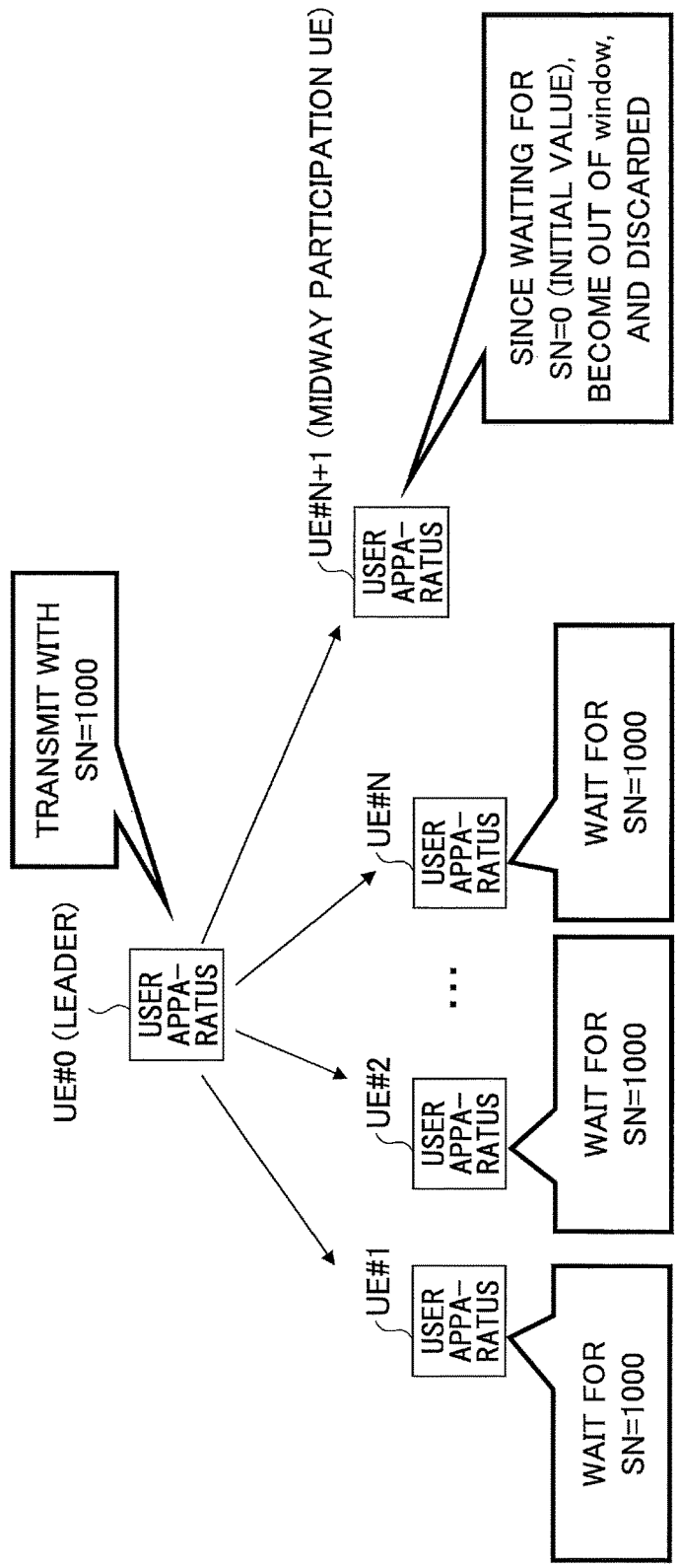
FIG. 4 is a diagram for explaining a problem in D2D communication of 1:M.
Figure 5:
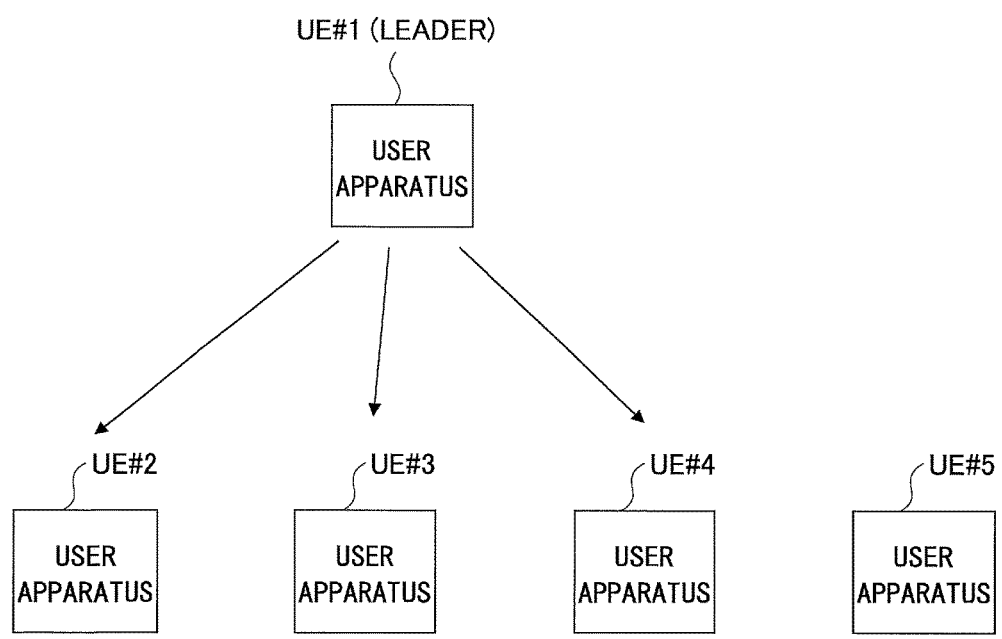
FIG. 5 is a whole block diagram of a communication system in an embodiment of the present invention.

FIG. 5 shows a whole configuration diagram of a communication system in the present embodiment. As shown in FIG. 5, the communication system of the present embodiment includes a user apparatus UE1 that is a leader and that is a distribution source of data by multicasting, a plurality of user apparatuses UE2-UE4 that receive multicast data from the user apparatus UE1, and a user apparatus UE5 that desires to newly receive multicast data. In FIG. 5, although four user apparatuses UE are shown as user apparatuses UE that receive multicast data, this is merely an example. In the present embodiment, there is no limitation for the number of user apparatuses UE that receive multicast data from the user apparatus UE1.

Each user apparatus UE shown in FIG. 5 may include both of general mobile telephone network communication functions via a base station eNB and D2D communication functions, or may include only the D2D communication functions. The D2D communication functions include a function of transmitting a discovery signal using a predetermined radio resource, a function of receiving a discovery signal and connecting to a user apparatus UE of a transmission source of the discovery signal by radio so as to perform D2D communication, and the like.

Also, the user apparatus UE1 that becomes a leader includes a multicast data distribution function, and the user apparatuses UE2-5 include a multicast data reception function. As described later, each user apparatus UE includes a function for executing layer 2 state matching.

The scheme of multicast communication in the present embodiment is not limited to a particular scheme as long as the same data can be transmitted from a user apparatus UE to user apparatuses UE of distribution destinations at the same time by the scheme. For example, a scheme may be adopted in which the leader UE performs data transmission using a channel for multicasting, and each user apparatus UE in the receiving side receives the channel for multicasting, or a scheme may be adopted in which an individual channel for D2D communication is set between the leaser UE and each user apparatus UE so as to perform data transmission by multicasting using the individual channel. Also, schemes other than these may be used.

However, it is assumed that the scheme of multicast communication in the present embodiment is a scheme in which each user apparatus UE in the reception side can individually transmit a signal to a user apparatus UE of the transmission side. As the signal, there is a join request for requesting reception of multicast data to a transmission side, ACK/NACK (example: status report of RLC) and the like.

(Operation Example of the System)

In the present embodiment, in a case where a user apparatus UE5 newly desires multicast data reception while the user apparatus UE1 of the leader is performing multicast communication to the user apparatuses UE2-4, control is performed such that values of a layer 2 state variable match between the user apparatus UE1 and the new user apparatus UE5. In the following, concrete example on the control is described as an operation example 1 and an operation example 2.

Operation Example 1

Figure 6:
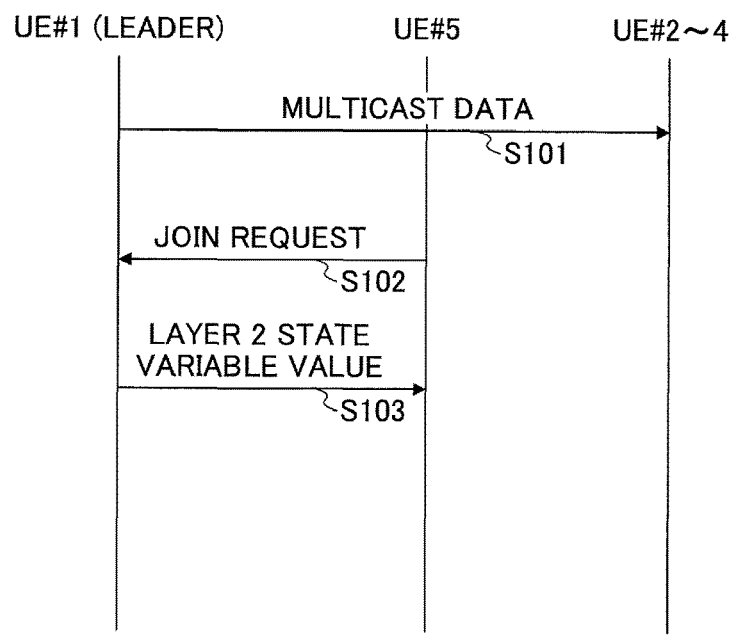
FIG. 6 is a sequence diagram for explaining an operation example 1.

First, an operation example 1 is described with reference to a sequence diagram of FIG. 6. In FIG. 6, user apparatuses UE2-4 are shown together such that the figure can be seen easily.

Step 101) The user apparatus UE1 of the leader is already performing data transmission to the user apparatuses UE2-4 by multicasting. Accordingly, the value of PDCP/RLC SN is sequentially increasing. In multicasting, basically, since the user apparatuses UE2-4 receive the same data from the user apparatus UE1 simultaneously, the values of PDCP/RLC SN are the same among user apparatuses UE1-4.

Also, in the present embodiment, the user apparatus UE1 of the leader performs control of PDCP/RLC with each user apparatus UE of the multicast data transmission destination. In the stage of step 101, it is assumed that, the COUNT value of PDCP is synchronized between the user apparatus UE1 and each user apparatus UE, each user apparatus UE2-4 receives RLC PDU from the user apparatus UE1 without drop, there is no window stalling and the like, and transmission of Status report and update of window are being performed normally.

Step 102) Here, for example, the user apparatus UE5 recognizes that there is the user apparatus UE1, in the neighborhood, that performs information distribution by multicasting by receiving a discovery signal that is transmitted from the user apparatus UE1 using a predetermined radio resource. Then, for example, by an operation on the user apparatus UE5 from a user (such as selectin of multicast information distribution reception from the user apparatus UE1), the user apparatus UE5 transmits, to the user apparatus UE1, a join request for requesting to join in a reception group of multicast data distributed from the user apparatus UE1.

In the present embodiment, this join request also serves as a layer 2 state variable value request. Instead of that, a join request and a layer 2 state variable value request may be transmitted at the same time as different signals, or may be transmitted at different timings. In the present embodiment, RLC SN, PDCP SN, and HFN are assumed as layer 2 state variables. But, these are merely examples.

Step 103) When the user apparatus UE1 of the leader receives the join request transmitted from the user apparatus UE5, the user apparatus UE1 explicitly notifies the user apparatus UE5 of a value of a layer 2 state variable (RLC SN, PDCP SN, HFN) that should be used in the user apparatus UE5 so as to match the value of the layer 2 state variable of the user apparatus UE5 with the value of the layer 2 state variable of the user apparatus UE1.

For the notification of the layer 2 state variable value, control PDU of PDCP or RLC and the like is used, for example. Also, as a channel used for notification, a channel similar to a control channel defined between eNB and UE in LTE can be used, for example.

In the present embodiment, the user apparatus UE1 notifies the user apparatus UE5 that transmits the join request of the layer 2 state variable by using CCCH (common control channel). Since the CCCH is not related to RLC/PDCP, CCCH can be interpreted without knowing the layer 2 state variable. The channel for transmitting the layer 2 state variable is not limited to CCCH. A channel in which notification information can be interpreted without knowing the state of RLC/PDCP may be defined for D2D communication, and the channel may be used.

The user apparatus UE5 that receives the value of the layer 2 state variable of the user apparatus UE1 in step 103 uses the value of the layer 2 state variable so as to start data reception from the user apparatus UE1.

Operation Example 2

Figure 7:
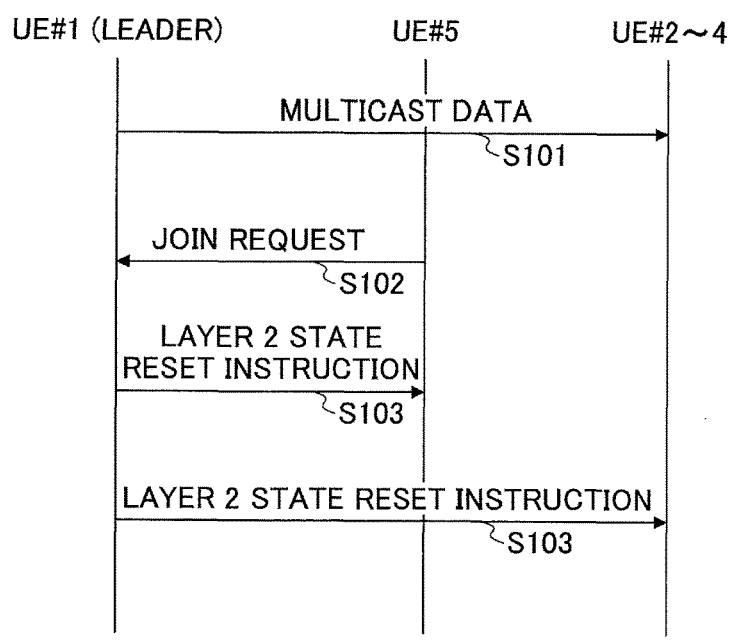
FIG. 7 is a sequence diagram for explaining an operation example 2.

Next, an operation example 2 is described with reference to FIG. 7. In the operation example 2, compared with the operation example 1, the operation after the user apparatus UE1 receives a join request from the user apparatus UE5 in step 102 is different. In the following, different points from the operation example 1 are described.

Step 103) In the operation example 2, when the user apparatus UE1 of the leader receives a join request transmitted from the user apparatus UE5, the user apparatus UE1 transmits a layer 2 state reset instruction signal for instructing layer 2 state reset to all user apparatuses UE (user apparatuses UE2-4 already joined to reception group of multicast and the user apparatus UE5 newly requesting join). Each user apparatus UE that receives the layer 2 state reset instruction signal forcibly initializes all layer 2 state variables. Also, the leader user apparatus UE1 initializes all layer 2 states in addition to transmitting the layer 2 state reset instruction signal. According to such reset of layer 2 states, even if the state such as window stalling is occurring, the state is reset and resolved.

After the reset of the layer 2 state, the value of the layer 2 state variable increases from the initial value in every user apparatus UE, so the user apparatuses UE2-5 are synchronized with the user apparatus UE1 so that the user apparatuses UE2-5 can receive data (RLC/PDCP PDU) normally.

As to the channel for transmitting the layer 2 state reset instruction signal, for example, CCCH may be used like the operation example 1. Also, a channel in which notification information can be interpreted without knowing the state of RLC/PDCP may be defined for D2D communication, and the channel may be used.

Also, the layer 2 reset may be executed by applying an intra-cell HO procedure or a re-connection procedure between eNB and UE to the leader user apparatus UE1 and each user apparatus UE of receiving side.

Also, in the above-mentioned operation example 1 and the operation example 2, after the user apparatus UE5 transmits a join request (layer 2 state variable value request), if the layer 2 state does not match with that of the user apparatus UE1 so that data reception cannot properly be performed for a predetermined period, the user apparatus UE5 may transmit a request to the user apparatus UE1 again. Also, in a case where a mismatch of the layer 2 state variable value occurs between a user apparatus UE and the user apparatus UE1 due to temporal disconnection of radio connection with the user apparatus UE1 while receiving multicast data, it is possible that the user apparatus UE transmits a join request (layer 2 state variable value request) to the user apparatus UE1 so as to perform state matching like the operation example 1 and the operation example 2.

Also, in the operation example 2, the user apparatus UE1 instructs layer 2 state resetting in response to receiving a join request from the user apparatus UE5 in which the layer 2 state does not match that of the user apparatus UE1. Instead of that, even when the user apparatus UE1 does not receive a join request, the user apparatus UE1 may perform layer 2 state matching by transmitting, periodically, for example, the layer 2 state reset instruction signal to all user apparatuses UE that receive multicast date as described in the operation example 2.

(Apparatus Configuration, Process Flow)

Figure 8:
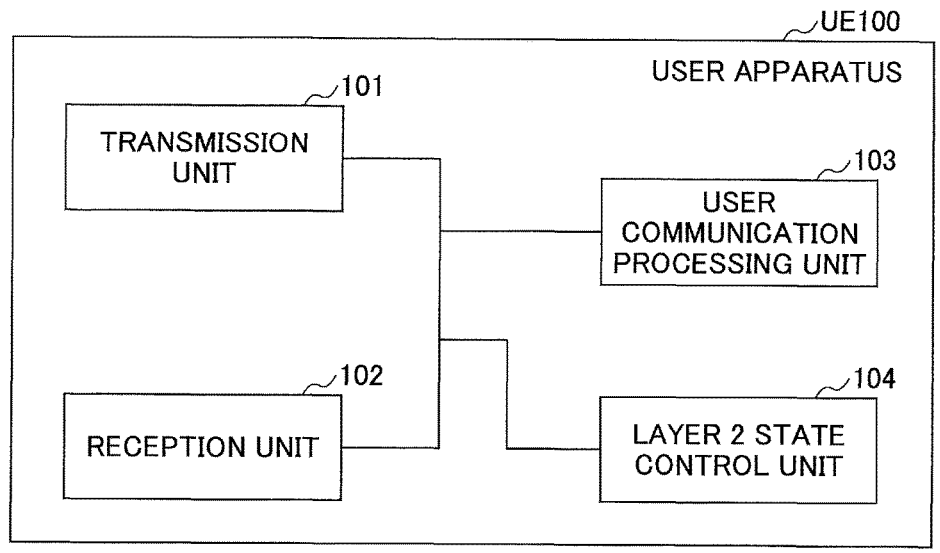
FIG. 8 is a functional block diagram of a user apparatus 100 in an embodiment of the present invention.

FIG. 8 shows a functional block diagram pf the user apparatus UE100 of the present embodiment. In the present embodiment, the user apparatuses UE1-5 have the same configuration. The user apparatus UE100 can be used as any of the user apparatuses UE1-5. By the way, a user apparatus UE having the function that becomes a leader and a user apparatus UE that does not have the function that becomes the leader but that can receive multicast data may be provided separately.

As shown in FIG. 8, the user apparatus UE100 of the present embodiment includes a transmission unit 101, a reception unit 102, a data communication processing unit 103, and a layer 2 state management unit 104.

Although it is assumed that the transmission unit 101 and the reception unit 102 of the user apparatus UE100 shown in FIG. 8 are functional units for D2D communication, the transmission unit 101 and the reception unit 102 shown in FIG. 8 may also serve as a transmission function and a reception function for performing communication by the mobile network via the base station eNB, or, the user apparatus UE100 may be provided with a transmission unit and a reception unit, separately from the transmission unit 101 and the reception unit 102 for D2D communication, for performing communication by the mobile network via the base station eNB. Also, the configuration shown in FIG. 8 only shows functional units on the embodiment of the present invention, and the user apparatus UE100 also includes functions, not shown in the figure, for realizing D2D communication.

The transmission unit 101 transmits a signal to another apparatus by radio communication, and the reception unit 102 receives a signal from another apparatus by radio communication. In the present embodiment, each of the transmission unit 101 and the reception unit 102 includes a function for performing communication by radio interface protocols (layer 1, layer 2, layer 3) of LTE. That is, each of the transmission unit 101 and the reception unit 102 includes a PDCP communication function and a RLC communication function, and includes a buffer for storing transmitting/receiving PDU and the like, and a buffer for storing layer 2 state variable values and the like.

The data communication processing unit 103 is a functional unit corresponding to an application for performing data transmission and reception by multicasting. In a transmission side of multicast data, the layer 2 state control unit 104 performs notification of a layer 2 state variable value, layer 2 state reset instruction and the like described in the operation examples 1 and 2, and performs reset of the layer 2 state variable for multicast data communication in the transmission unit 101 when performing layer 2 state reset instruction.

In a reception side of multicast data, the layer 2 state control unit 104 transmits a join request (layer 2 state variable value request) to a user apparatus UE of a transmission side of multicast data based on a multicast data reception instruction from the data communication processing unit 103 by user operation, for example.

Figure 9:
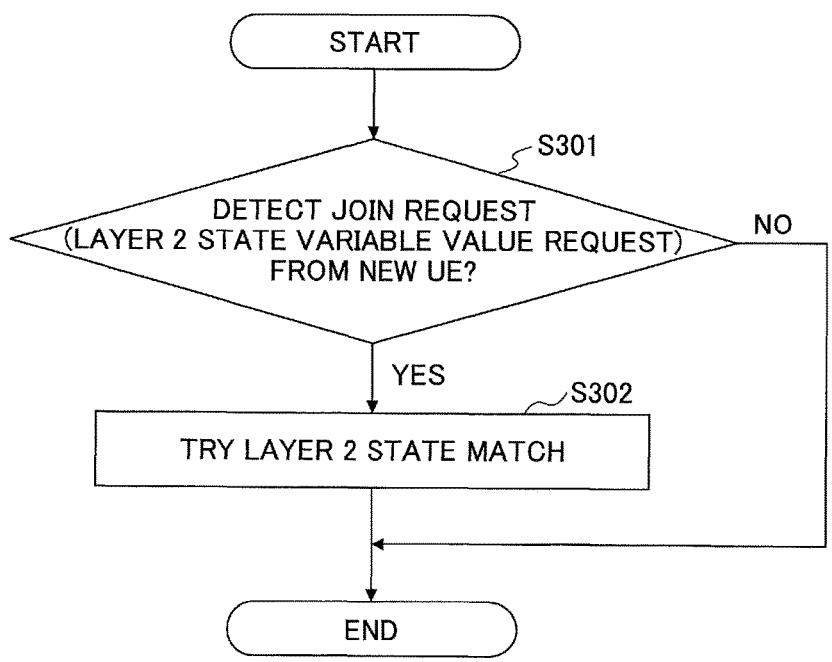
FIG. 9 is a process flow of reception of a join request when the user apparatus UE100 becomes a leader user apparatus UE.

FIG. 9 shows a process flow for receiving a join request when the user apparatus UE100 becomes a transmission side of multicast data, that is, the user apparatus UE100 becomes a leader user apparatus UE.

As shown in FIG. 9, while the user apparatus UE100 is transmitting multicast data, the layer 2 state control unit 104 determines whether a join request (that also serves as a layer 2 state variable request) is received from a user apparatus UE that desires to receive multicast data (step 301).

When the layer 2 state control unit 104 detects reception of the join request (Yes in step 301), the layer 2 state control unit 104 performs processing for matching layer 2 state variable values between the user apparatus UE100 and the user apparatus UE that is a transmission source of the join request as described in the operation example 1 and the operation example 2 (step 302). That is, for the case of the operation example 1, the layer 2 state control unit 104 transmits, to the user apparatus UE that transmits the join request, a value of the layer 2 state variable that the user apparatus UE should use. The value of the layer 2 state variable that the user apparatus UE should use is, for example, a current value of the layer 2 state variable in the leader user apparatus UE100. In the present embodiment, although the value of the layer 2 state variable in the leader user apparatus UE100 is assumed to be controlled such that the value becomes the same as that in each user apparatus UE of multicast distribution destination, the process is not limited to this. Also, the leader user apparatus UE100 may have respective values of the layer 2 state variable for each user apparatus UE, or may have a common value of the layer 2 state variable for each user apparatus UE.

For the case of the operation example 2, the layer 2 state control unit 104 instructs layer 2 state reset to all user apparatuses UE (user apparatuses UE already performing multicast data reception and the user apparatus UE that transmits the join request), and also instructs, to the transmission unit 101, reset of layer 2 state relating to multicast communication that is currently being transmitted.

The layer 2 state control unit 104 may select whether to perform the operation example 1 or the operation example 2 according to the number of join requests from different user apparatuses UE that are received within a predetermined time period (that is, according to the number of user apparatuses UE that transmitted a join request). For example, a threshold X is defined, and the layer 2 state control unit 104 performs layer 2 state reset of the operation example 2 when the number of the join requests received within the predetermined period is equal to or greater than the threshold X, and the layer 2 state control unit 104 performs layer 2 state variable value transmission of the operation example 1 for each user apparatus UE that transmits the join request when the number of the join requests is less than the threshold X.

FIG. 10 shows a process flow in a case where the user apparatus UE100 newly becomes a reception side of multicasting, that is, when the user apparatus UE100 desires to newly receive multicast data that is distributed from a leader user apparatus UE (leader UE).

The data communication processing unit 103 of the user apparatus UE100 ascertains that a leader UE that performs multicast data transmission exists in a neighborhood based on a discovery signal transmitted from the leader UE, for example. Then, for example, based on an instruction by a user, the data communication processing unit 103 establishes a radio connection with the leader UE for receiving multicast data from the leader UE so as to start D2D communication with the leader UE (step 401).

When the data communication processing unit 103 starts D2D communication with the leader UE for receiving multicast data (Yes in step 401), the layer 2 state control unit 104 transmits a join request (that also serves as a layer 2 state variable value request) to the leader UE (step 402).

The leader UE that receives the join request performs processing for matching layer 2 state variables between the leader UE and the user apparatus UE100 as described in the operation example 1 and the operation example 2, so that the layer 2 state control unit 104 of the user apparatus UE100 matches the layer 2 state variable value with the layer 2 state variable value of the leader UE according to the processing (step 403).

That is, in a case of the operation example 1, the leader UE transmits, to the user apparatus UE100 that transmits the join request, a layer 2 state variable value that the user apparatus UE100 should use, the layer 2 state control unit 104 of the user apparatus UE100 receives a signal including the layer 2 state control variable value so as to instruct the reception unit 102 to use the layer 2 state variable value. In a case of the operation example 2, the leader UE instructs layer 2 state reset to all user apparatuses UE (user apparatuses UE already receiving multicast data and the user apparatus UE100 that transmits the join request), so that the layer 2 state control unit 104 of the user apparatus UE100 that receives the instruction instructs the reception unit 102 to reset layer 2 state. That is, it instructs to use an initial value as the layer 2 state variable value. The reception unit 102 that receives the instruction performs layer 2 control using the instructed layer 2 state variable value and receives data.

Summary of Embodiment, Effect, and the Like

In the present embodiment, there is provided a communication apparatus including a function configured to perform data transmission by multicasting to a plurality of apparatuses by radio communication, including:

a request reception unit configured to receive a join request from an apparatus that desires multicast data reception from the communication apparatus;

a match control unit configured to perform control for matching values of a state variable of layer 2 in the radio communication between the communication apparatus and the apparatus that transmits the join request in response to receiving the join request by the request reception unit.

The communication apparatus is a user apparatus UE. But, communication apparatus can be a base station eNB. The present invention can be applied when the base station eNB performs multicasting while performing layer 2 state control.

For example, the match control unit notifies the apparatus that transmits the join request of a value of the state variable that should be used in the apparatus. Accordingly, control can be performed only for the apparatus that transmitted the join request, so that it is possible to realize control that decreases effect to other apparatuses.

The match control unit may instruct an apparatus that has already performed multicast data reception and the apparatus that transmits the join request to reset the state of layer 2. According to this configuration, when there are many apparatuses that transmits a join request, layer 2 state matching can be realized efficiently.

Also, the match control unit may periodically instruct an apparatus that is performing multicast data reception to reset the state of layer 2 irrespective of presence or absence of the join request. According to this configuration, even when there is no join request, it becomes possible to restore an apparatus in which the state of layer 2 does not match that of the leader UE or an apparatus in which stalling is occurring to normal state, for example.

Also, according to the present embodiment, there is provided a communication apparatus including a function configured to receive data that is transmitted by multicasting from a predetermined apparatus by radio communication, including:

a request transmission unit configured to transmit a join request for performing multicast data reception from the predetermined apparatus; and a match control unit configured to receive, from the predetermined apparatus that receives the join request, a signal for matching values of a layer 2 state variable in the radio communication between the predetermined apparatus and the communication apparatus, and to use a value of the layer 2 state variable obtained based on the signal for the radio communication.

For example, the match control unit receives, from the predetermined apparatus, a signal including a value of the state variable that should be used by the communication apparatus. According to this configuration, control can be performed only for the apparatus that transmitted the join request, so that it is possible to realize control that decreases effect to other apparatuses. Also, the match control unit may receive, from the predetermined apparatus, a signal for instructing reset of a state of layer 2.

In the above, each embodiment of the present invention has been explained. However, the disclosed invention is not limited to the embodiments. Those skilled in the art will conceive of various modified examples, corrected examples, alternative examples, substituted examples, and the like. While specific numerical value examples are used to facilitate understanding of the present invention, such numerical values are merely examples, and any appropriate value may be used unless specified otherwise. Classification into each item in the description is not essential in the present invention, and features described in two or more items may be combined and used as necessary. Subject matter described in an item may be applied to subject matter described in another item (provided that they do not contradict).

It is not always true that the boundaries of the functional units or the processing units in the functional block diagram correspond to boundaries of physical components. The operations by the plural functional units may be physically performed by a single component. Alternatively, the operations by the single functional unit may be physically performed by plural components.

For convenience of explanation, the user apparatus and the base station have been explained by using functional block diagrams. However, each apparatus may be implemented in hardware, software, or a combination thereof.

The software executed by a processor (CPU) provided in the user apparatus UE according to the present invention may be stored in any proper storage medium such as a Random Access Memory (RAM), a flash memory, a Read Only Memory (ROM), an EPROM, an EEPROM, a register, a hard disk (HDD), a removable disk, a CD-ROM, a database, a server and the like.

The present invention is not limited to the above-mentioned embodiment and is intended to include various variations, modifications, alterations, substitutions and so on without departing from the spirit of the present invention.

The present international application claims priority based on Japanese patent application No. 2013-227528, filed in the JPO on Oct. 31, 2013, and the entire contents of the Japanese patent application No. 2013-227528 are incorporated herein by reference.

DESCRIPTION OF REFERENCE SIGNS

UE user apparatus
eNB base station
101 transmission unit
102 reception unit
103 data communication processing unit
104 layer 2 state management unit

The invention claimed is:

1. A user apparatus capable of functioning as a leader user apparatus by performing data transmission by multicasting to a plurality of partner user apparatuses by device-to-device radio communication, comprising:
a request reception unit configured to receive a join request from a partner user apparatus that desires multicast data reception from the leader user apparatus;
a match control unit configured to perform control for matching values of a state variable of layer 2 in the radio communication between the leader user apparatus and the partner user apparatus that transmits the join request in response to receiving the join request by the request reception unit,
wherein the match control unit periodically instructs the plurality of partner user apparatuses that are performing multicast data reception to reset the state of layer 2 irrespective of presence or absence of the join request.

2. The user apparatus as claimed in claim 1, wherein the match control unit notifies the partner user apparatus that transmits the join request of a value of the state variable that should be used in the partner user apparatus.

3. The user apparatus as claimed in claim 1, wherein the match control unit instructs a partner user apparatus that has already performed multicast data reception and the partner user apparatus that transmits the join request to reset the state of layer 2.

4. A layer 2 state control communication system comprising:
a leader user apparatus; and a plurality of partner user apparatuses,
wherein the leader user apparatus performs data transmission by multicasting to the plurality of partner user apparatuses by device-to-device radio communication,
wherein the leader user apparatus comprises:
a request reception unit configured to receive a join request from a partner user apparatus that desires multicast data reception from the leader user apparatus; and
a match control unit configured to, in response to receiving the join request, perform control for matching values of a state variable of layer 2 in the radio communication between the leader user apparatus and the partner user apparatus that transmits the join request,
wherein each comprises:
a request transmission unit configured to transmit a join request for performing multicast data reception from the leader user apparatus; and
a match control unit configured to receive, from the leader user apparatus, a signal for matching values of the layer 2 state variable in the radio communication between the leader user apparatus and the partner user apparatus, and to use a value of the layer 2 state variable obtained based on the signal for the radio communication, and
wherein the match control unit of the leader user apparatus periodically instructs the plurality of partner user apparatuses that are performing multicast data reception to reset the state of layer 2 irrespective of presence or absence of the join request.

5. The layer 2 state control communication system as claimed in claim 4, wherein the match control unit of a partner user apparatus receives, from the leader user apparatus, a signal including a value of the state variable that should be used by the partner user apparatus.

6. The layer 2 state control communication system as claimed in claim 4, wherein the match control unit of the partner user apparatus receives, from the leader user apparatus, a signal for instructing reset of a state of layer 2.

7. A layer 2 state control method executed by a user apparatus capable of functioning as a leader user apparatus by performing data transmission by multicasting to a plurality of partner user apparatuses by device-to-device radio communication, comprising:
receiving a join request from a partner user apparatus that desires multicast data reception from the leader user apparatus;
performing control for matching values of a state variable of layer 2 in the radio communication between the leader user apparatus and the partner user apparatus that transmits the join request in response to receiving the join request, and periodically instructing the plurality of partner user apparatuses that are performing multicast data reception to reset the state of layer 2 irrespective of presence or absence of the join request.

\* \* \* \* \*